United States Patent Office 3,732,313
Patented May 8, 1973

3,732,313
HIGH MOLECULAR WEIGHT POLYOLS
Samuel H. Sharman, Kensington, and Mitchell Danzik, Pinole, Calif., assignors to Chevron Research Company, San Francisco, Calif.
No Drawing. Original application Aug. 28, 1970, Ser. No. 68,030, now Patent No. 3,646,100. Divided and this application Sept. 27, 1971, Ser. No. 184,246
Int. Cl. C07c 49/18
U.S. Cl. 260—594    4 Claims

ABSTRACT OF THE DISCLOSURE

High molecular weight polyols of the formula:

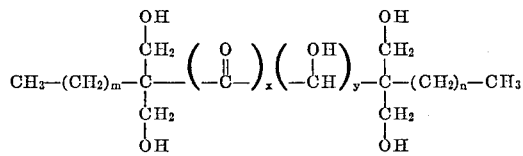

in which $m$ and $n$ are integers from 0 to 40 and the sum of $m$ and $n$ is from 15 to 40, $x$ and $y$ are integers from 0 to 1 and the sum of $x$ and $y$ is 1. These are useful as intermediates in the preparation of detergents.

CROSS-REFERENCE TO RELATED APPLICATION

This application is a division of U.S. application Ser. No. 68,030, filed Aug. 28, 1970, now Patent No. 3,646,100.

BACKGROUND OF THE INVENTION

Field of the invention

The present invention is concerned with novel synthetic detergents and more particularly with novel polysulfates which are suitable as biodegradable and phosphate-free detergent compositions.

Increased concern with water pollution has produced significant changes in household detergents. Initially, major emphasis has been placed on producing biodegradable surface active components for detergents. The shift to linear surface active materials, including linear algyl benzene sulfonates (LAS) and alpha olefin sulfonates, etc., has reduced pollution attributed to nonbiodegradability. However, the above-mentioned surface active materials are not adequate in terms of soil removal in the absence of phosphate builders. Increasing evidence appears to indicate that phosphates contribute to the growth of algae in the nation's streams and lakes. This algae growth poses a serious pollution threat to the maintenance of clear good domestic water supplies.

It is therefore desirable to produce surfactant materials which function well in the absence of phosphate builders and possess biodegradable characteristics.

Prior art

In the past, certain polysulfates derived from higher molecular weight polyalcohols have been disclosed.

U.S. Patent 2,014,782 discloses materials particularly suitable for use in textile manufacture which are disulfates derived from unsaturated fatty alcohols from sperm oil. The unsaturated alcohols are reacted with sulfuric acid, hydrolyzed by boiling water, separated from the water and sulfated with chlorosulfonic acid. The product is usually a 1,9-octadecane disulfate.

U.S. Patent 2,091,956 discloses disulfates which are prepared from vicinal hydroxy alkyl materials of from 12 to 38 carbon atoms. These materials, glycols, are obtained by the sodium reduction of the esters of high fatty acids followed by hydrogenation of the resulting acyloins to glycols. After sulfation of the glycols, the resulting materials after neutralization are said to be useful as detergents, wetting agents and emulsifying agents.

As may be seen, the materials of the above references are either secondary sulfates or a combination of a primary and a secondary sulfate. The preparation of the secondary sulfates is usually complicated by the propensity of the materials to dehydrate when sulfation by $SO_3$ or sulfuric acid is attempted, producing large amounts of unsaturated materials and resulting in low yields of detergents. In order to achieve substantial yields, of desired product, sulfation with chlorosulfonic acid in a complexing solvent such as ether is necessary.

SUMMARY OF THE INVENTION

Novel compounds which may be suitably employed as phosphate-free detergents are provided. These compounds are of the following general structure

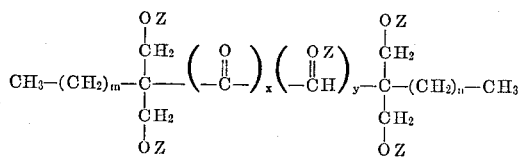

in which $m$ and $n$ are integers from 0 to 40 and the sum of $m$ and $n$ is from 15 to 40, $x$ and $y$ are integers from 0 to 1 and the sum of $x$ and $y$ is 1, Z is H or—$SO_3Q$ in which Q is a water soluble, salt-forming cation, and at least 3 and preferably 4 Z's are —$SO_3Q$. Q is preferably an alkali metal cation and is most preferably $Na^+$. Preferably the sum of $m$ and $n$ will be from 20 to 35.

The detergent compounds are prepared by the sulfation of polyhydroxy intermediates which are derived from higher ketones—that is, ketones of from about 20 to 45 carbon atoms, preferably about 25 to 35 carbon atoms.

The higher ketones which are employed are preferably linear and may be derived by conventional techniques from fatty acids. Thus, they may be prepared by the thermal decarboxylation of the fatty acids. By this procedure the acids are heated in the presence of barium, calcium or thorium oxides or hydroxides, or the corresponding barium, thorium or calcium salts of the acid are heated, resulting in the loss of one carboxyl group and resulting in the preparation of a ketone having one less carbon atom than the pair of original condensed acid or salt molecules. Mixtures of various acids may be employed with the resulting carbonyl group being at any position on the chain. Ketones prepared by other techniques such as the hydration of dialkyl alkynes, the oxidation of internal olefins, or the rearrangement of 1,2-glycols may also be employed.

By a preferred procedure in producing the purified pentahydroxy alkyl material, the high molecular weight ketone is reacted with formaldehyde in acetic acid in the presence of a catalytic amount of a mineral acid to form a crude reaction mixture. This mixture is then reacted with acetic anhydride and sulfuric acid in order to destroy the considerable amount of formal which forms during the reaction. The resulting polyester, which contains a carbonyl group, is reduced by conventional reduction techniques (e.g., $LiAlH_4$, $H_2$/cat, etc.) to form a polyol containing 3 to 5 hydroxy groups. Direct sulfation of this material by conventional methods (e.g., with $SO_3$, sulfuric acid, oleum, or chlorosulfonic acid) produces a detergent precursor having from 3 to 5 sulfate groups per molecule, the major constituent containing about four sulfate groups per molecule.

Neutralization of the sulfates prepared by the above techniques with water-soluble, salt-forming cations yields the desired product which has highly desirable detergent properties. Thus the sulfated products may be neutralized with aqueous basic solutions containing compounds such as hydroxides, carbonates, and acids of the alkali metals, alkaline earth metals, ammonium and other water-soluble salt-forming cationic agents.

The polyol intermediates can, if desired, be isolated and are suitably employed in other organic preparations. For example, they may be employed as cross-linking agents in polyurethane compositions giving internal plasticization as well as rigidification. By the hydrolysis or saponification of the ester groups the compounds may be isolated as the mono ketone tetraol. The pentaol form can be obtained by reduction of the ketone polyester. The materials will have the following general formula

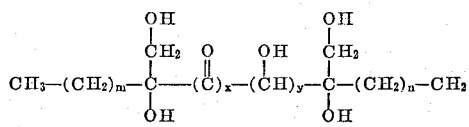

In general, when the compounds of the present invention are formulated as detergent compositions, additional compatible ingredients may be incorporated therein to enhance their detergent properties. Such ingredients may include, but are not limited to, anticorrosion, antiredeposition, bleaching and sequestering agents, optical whiteners and certain organic and inorganic alkali and alkaline earth salts, such as inorganic sulfates, carbonates, or borates, and organic salts of the amino polycarboxylic acids; e.g., trisodium salt of nitrilo triacetic acid, tetrasodium salt of ethylene diamine tetraacetic acid, etc. In addition, other builder materials such as the salts of polymeric carboxylic materials such as the copolymers of ethylene and maleic anhydride may be employed as builder additives.

Surprisingly, the novel compounds of the present invention exhibit high detersive characteristics even in the absence of phosphate builders. In particular, formulations containing sodium or potassium sulfates as the major active ingredient are preferred. This is unexpected, in view of the majority of household heavy duty detergent compositions which require the presence of large amounts of phosphate builders in order to exhibit satisfactory detergency levels.

The following examples illustrate the preparation of the detergent sulfate compounds and the polyol precursors of this invention. The examples are intended to be only illustrative and are not limiting.

EXAMPLE 1

Preparation of 31-carbon ketone

A mixture of 40 g. of palmitic acid and 10 g. of magnesium oxide was charged to a 1-liter 4-necked flask fitted with a stirrer, condenser, thermometer, dropping funnel, and heating mantle. The mixture was heated to 330–340° C. Steam was passed through the condenser throughout the reaction. A total of 216 g. of additional palmitic acid was melted and added through the dropping funnel in about 10 g. portions every 10–15 minutes. A vigorous reaction ensued after each addition. The acid was kept molten by heating the dropping funnel with an infrared lamp.

The mixture was hand stirred occasionally and heated at 330–340° C. for a total of 10 hours.

The mixture was then cooled to 90° C. and a 250 ml. portion of a solution of 50 ml. of concentrated sulfuric acid in 500 ml. of water was added. The mixture was refluxed, cooled, and decanted. It was then refluxed twice with 1-liter portions of water, once with 1 liter of 1 N sodium hydroxide, and three times more with 1-liter portions of water. The solid material was filtered from the solution, crushed, dried, and recrystallized from 1 liter of a 2:1 mixture of benzene and alcohol. A total of 182 g. of a $C_{21}$ linear ketone was recovered in a 77% yield.

EXAMPLE 2

Preparation of polyalcohol

To a 500 ml. 3-necked flask fitted with a stirrer, condenser, thermometer, and nitrogen inlet was added 30 g. of paraformaldehyde (1.0 mol equivalent of formaldehyde), 170 ml. of glacial acetic acid, and 1.4 ml. of concentrated sulfuric acid. The mixture was stirred and heated to 90–95° C. under a nitrogen atmosphere. After about 15 minutes, 45 g. (0.1 mol) of the ketone prepared in Example 1 was added to the reaction flask. The mixture was heated at 105–110° C. for six hours, an additional 0.3 ml. of sulfuric acid was added, and heating continued for an additional three hours.

After cooling the reaction mixture to room temperature, 200 ml. of ether was added. The solution was extracted with several 100-ml. portions of water, two 100-ml. portions of 0.5 N sodium hydroxide, then with several portions of water until neutral. The remaining ether solution was dried over sodium sulfate, decanted, and evaporated to dryness. A 60 g. yield was recovered.

In order to destroy the formal which formed during the reaction, 59 g. of the above mixture was heated to 80° C. for 1½ hours in 150 ml. acetic anhydride containing 2 ml. of sulfuric acid. This workup was the same as above.

EXAMPLE 3

Reduction of the polyester

To a 2,000-ml. 3-necked flask fitted with a stirrer, condenser, thermometer, dropping funnel, and nitrogen inlet was added 12 g. of lithium aluminum hydride. 750 ml. of anhydrous ether was added through the addition funnel in about 5 minutes. A solution of 60 g. of the tetraester product of Example 2 in 250 ml. ether was added dropwise over a period of 45 minutes. The reaction flask was cooled in an ice bath so that the reaction temperature remained below 25° C. After the addition was completed, the reaction mixture was stirred at room temperature for 24 hours.

The product was transferred to a beaker and cooled in an ice-acetone bath. A freshly prepared saturated solution of anhydrous powdered sodium sulfate was added about 1 ml. at a time with stirring until evolution of gas ceased.

The solid material was filtered from the reaction mixture, dried, ground, and slurried with a mixture of 1500 ml. of dilute acid and 1500 ml. ether. The ether layer was decanted and combined with the ether filtrate from the reaction. This process was repeated until no more solid was obtained by the ether extraction of the slurry.

EXAMPLE 4

Preparation of polysulfate

About 0.6 g. of a polyalcohol made from a $C_{35}$ ketone was dissolved in 150 ml. ether. 1.6 g. of chlorosulfonic acid was added dropwise to the rapidly stirred solution. The solution was neutralized with dilute sodium hydroxide and the mixture was evaporated to remove the ether layer. The remaining water solution of the desired polysulfate was diluted to a known volume and aliquots were removed for a Hyamine titration[1] to determine the degree of sulfation.

Detergency of the compounds of the present invention is measured by its ability to remove natural sebum soil from cotton cloth. By this method, small swatches of cloth, soiled by rubbing over face and neck, are washed with test solutions of detergents in a miniature laboratory washer, and the reflections of the various cloths measured and compared. The results obtained are expressed as relative detergency values.

---

[1] See method of House and Darrraghh, Anal. Chem., 26, 1492 (1964).

The relative detergency value is obtained by comparing and correlating the reflectance value results from the test solution with the results from two defined standard solutions.

The two standard solutions are selected to represent a detergent system exhibiting relatively high detersive characteristics and a system exhibiting relatively low detersive characteristics.

By testing experimental solution against the standardized solutions on cotton cloth soiled with natural sebum soil, the results can be accurately correlated. The two standard solutions were prepared:

FORMULATION FOR THE LOW DETERSIVE STANDARD (CONTROL A)

| Ingredient: | Weight percent |
|---|---|
| Alkyl benzene sulfonate | 35 |
| Sodium triphosphate | 40 |
| Water | 8.5 |
| Sodium sulfate | 8 |
| Sodium silicate | 7 |
| Carboxymethylcellulose | 0.8 |

FORMULATION FOR THE HIGH DETERSIVE STANDARD (CONTROL B)

| Ingredient: | Weight percent |
|---|---|
| Linear alkyl benzene sulfonate (LAS) | 7.5 |
| Tallow alcohol sulfate | 10 |
| Sodium triphosphate | 47.5 |
| Water | 10 |
| Sodium sulfate | 13 |
| Sodium silicate | 5 |
| Carboxymethylcellulose | 1 |

The standard exhibiting high detersive characteristics was prepared by dissolving a relatively large amount of the above formulation (Control B) (2.0 g.) in 1 liter of 300 p.p.m. hard water (calculated as ⅔ calcium carbonate and ⅓ magnesium carbonate). The low detersive standard contained a relatively low concentration of the formulation (Control A) (1.0 g.) dissolved in 1 liter of 300 p.p.m. water (same basis).

The test solutions consisted of the detergent additive high molecular weight polysulfates formulated in the following manner:

| Ingredient: | Weight percent |
|---|---|
| Active detergent | 25 |
| Sodium sulfate | 59 |
| Carboxymethylcellulose | 1 |
| Sodium silicate | 7 |
| Water | 8 |

LAS comparative formulations were also prepared in the same way.

Four test solutions were prepared from each formulation. The first two consisted of 1 and 2 g. portions, respectively, of the formulation dissolved in 1 liter of 50 p.p.m. hard water. The third and fourth consisted of 1 and 2 g. portions, respectively, of the formulation dissolved in 1 liter of 180 p.p.m. hard water.

The miniature laboratory washer used was so constructed that the two standard formulations and two test formulations could be used to wash different parts of the same swatch. This arrangement ensured that all four formulations were working on identical soil (natural facial soil). Relative detergency (RD) values were calculated from soil removals (SR), according to the equation:

$$RD = 2 + 4 \frac{\text{Percent } SR_{\text{Test}} - \text{Percent } SR_{\text{Control A}}}{\text{Percent } SR_{\text{Control B}} - \text{Percent } SR_{\text{Control A}}}$$

For comparison purposes one formulation contained 25% LAS as a detergent active and 40% sodium triphosphate. The remainder of the formulation was the same as above except that the sodium sulfate content was 19%.

Detergency test results obtained on a variety of the polysulfates and the LAS formulations are given in the table following. These data clearly show that the polysulfates and particularly the material derived from a $C_{31}$ ketone in the absence of any builder are superior to the unbuilt LAS formulation and are equivalent to a phosphate built LAS formulation in hard water. These results are unexpected.

RELATIVE DETERGENCY OF POLYSULFATES

| Test materials | | Relative detergency ratings | | | |
|---|---|---|---|---|---|
| Sample | Carbon atoms in ketone | 50 p.p.m. $H_2O$, concentration | | 180 p.p.m. $H_2O$, concentration | |
| | | 0.1% | 0.2% | 0.1% | 0.2% |
| Linear alkylbenzene sulfonate (unbuilt LAS) | | 2.8 | 4.4 | 0.9 | 2.2 |
| Linear alkylbenzene sulfonate plus phosphate (40% of $Na_2SO_4$ replaced by sodium tripolyphosphate) | | 6.3 | 6.6 | 2.4 | 5.8 |
| Polysulfate [1] | 31 | [2] 4.3 | [2] 5.3 | [3] 3.7 | [3] 4.8 |
| Do.[1] | 35 | 3.1 | 4.8 | 2.9 | 3.5 |
| Do.[1] | 39 | 2.2 | 3.2 | | |
| Do.[1] | 43 | 1.8 | 2.9 | | |
| Do.[1] | 27 | [3] 3.0 | [3] 4.3 | | |

[1] Prepared by the described method.  [2] Average of 3 runs.  [3] Average of 2 runs.

Thus, the polysulfates of this invention find substantial use in various built and unbuilt, liquid or solid detergent compositions.

In addition to their use as sulfate detergent precursors, the polyols of this invention, with or without the presence of carbonyl groups, are useful as cross-linking agents, solvents, etc.

While the character of this invention has been described in detail with numerous examples, this has been done by way of illustration only and without limitation of the invention. It will be apparent to those skilled in the art that modifications and variations of the illustrative examples may be made in the practice of the invention within the scope of the following claims.

We claim:

1. As a new composition of matter a polyol of the formula

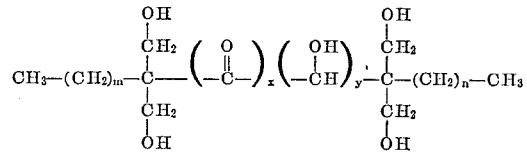

in which $m$ and $n$ are integers from 0 to 40; the sum of $m$ and $n$ is from 15 to 40; $x$ and $y$ are integers from 0 to 1; and the sum of $x$ and $y$ is 1.

2. The polyol of claim 1 in which $x$ is 1.
3. The polyol of claim 1 in which $y$ is 1.
4. The polyol of claim 3 in which the sum of $m$ and $n$ is 20 to 30.

References Cited

UNITED STATES PATENTS 3,024,249   3/1962   Wöllner _____ 260—594 X

LEON ZITVER, Primary Examiner

L. B. DeCRESCENTE, Assistant Examiner

U.S. Cl. X.R.

260—635 R